United States Patent
He et al.

(10) Patent No.: US 8,823,301 B2
(45) Date of Patent: Sep. 2, 2014

(54) METHOD AND DEVICE FOR DETECTING ROTOR POSITION IN A PERMANENT MAGNET SYNCHRONOUS MOTOR-DRIVEN WASHING MACHINE

(71) Applicant: Whirlpool Corporation, Benton Harbor, MI (US)

(72) Inventors: Biao He, Saint Joseph, MI (US); Qiang Mei, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 127 days.

(21) Appl. No.: 13/668,361

(22) Filed: Nov. 5, 2012

(65) Prior Publication Data

US 2014/0125265 A1     May 8, 2014

(51) Int. Cl.
*H02P 21/00*     (2006.01)

(52) U.S. Cl.
USPC ...... 318/400.02; 318/721; 318/430; 318/432; 318/437; 318/400.01; 388/813; 388/911

(58) Field of Classification Search
CPC ........... H02P 21/06; H02P 6/06; H02P 27/06; H02P 27/08
USPC ............. 318/400.01, 400.02, 400.14, 400.35, 318/721, 799, 801, 430, 432, 437; 388/906, 388/911, 813, 823
See application file for complete search history.

(56) References Cited

U.S. PATENT DOCUMENTS

| | | | |
|---|---|---|---|
| 5,821,708 A | 10/1998 | Williams et al. | |
| 6,249,094 B1 | 6/2001 | Zeh et al. | |
| 6,281,656 B1 | 8/2001 | Masaki et al. | |
| 6,448,725 B1 | 9/2002 | Cho et al. | |
| 6,584,813 B2 | 7/2003 | Peachee et al. | |
| 6,737,828 B2 | 5/2004 | Kiuchi et al. | |
| 6,834,407 B2 * | 12/2004 | Stephens | 8/158 |
| 6,940,237 B2 | 9/2005 | Weinmann | |
| 7,339,344 B2 | 3/2008 | Borisavljevic | |

(Continued)

FOREIGN PATENT DOCUMENTS

DE    10225610 A1    1/2004
DE    60033817 T2    12/2007

(Continued)

OTHER PUBLICATIONS

The German Patent and Trademark Office, German Search Report, German Patent Application No. 10 2013 109 746.4, Jan. 29, 2014, 3 pages.

*Primary Examiner* — Antony M Paul

(57) ABSTRACT

A device and method to determine the stopping rotor position of a washing machine motor includes an inverter, a permanent magnet synchronous motor, and an electronic motor controller. The controller determines the stopped rotor position of the motor by measuring induced currents in the stator field coils of the motor. While the motor is de-energized and slowly rotating, the controller directs the inverter to connect all of the stator field coils of the motor together. The stator field coils may be connected to a common D.C. rail, output from an A.C.-D.C. converter of the washing machine. In an embodiment, the controller determines the rotor position based on the polarities of current induced in the stator field coils. In another embodiment, the controller determines the rotor position based on the phase angle and angular frequency of the three phase currents, transformed into a stationary reference frame.

19 Claims, 5 Drawing Sheets

(56) References Cited

U.S. PATENT DOCUMENTS

| | | |
|---|---|---|
| 7,482,787 B2 | 1/2009 | Mellor et al. |
| 7,714,529 B2 | 5/2010 | Chen et al. |
| 7,746,024 B2 | 6/2010 | Rozman et al. |
| 7,808,201 B2 | 10/2010 | Borisavljevic |
| 7,818,983 B2 | 10/2010 | Jun |
| 7,999,498 B2 | 8/2011 | Gotz et al. |
| 8,324,851 B2 * | 12/2012 | Matsuo et al. ........... 318/400.33 |
| 2004/0183490 A1 | 9/2004 | Maeda |
| 2006/0049791 A1 | 3/2006 | Larsson |
| 2010/0090640 A1 | 4/2010 | Maekawa et al. |
| 2010/0139333 A1 | 6/2010 | Maekawa et al. |
| 2010/0186787 A1 | 7/2010 | Rosenbauer et al. |
| 2011/0012544 A1 | 1/2011 | Schulz et al. |
| 2011/0241723 A1 | 10/2011 | Abel et al. |

FOREIGN PATENT DOCUMENTS

| | | |
|---|---|---|
| DE | 60036192 T2 | 5/2008 |
| EP | 0993108 A2 | 4/2000 |
| EP | 1128543 A2 | 8/2001 |
| EP | 1195611 A1 | 4/2002 |

* cited by examiner

METHOD AND DEVICE FOR DETECTING ROTOR POSITION IN A PERMANENT MAGNET SYNCHRONOUS MOTOR-DRIVEN WASHING MACHINE

TECHNICAL FIELD

The present disclosure relates generally to a method for controlling an electric motor for a washing machine, and, more particularly, to a method for detecting a rotor position of a permanent magnet synchronous motor of a washing machine.

BACKGROUND

A washing machine is a domestic appliance for cleaning clothes, linens, and other laundry. A washing machine may include a tub and a drum positioned in the tub that is sized to receive laundry for cleaning. The washing machine may include an electric motor that causes the drum to rotate relative to the tub during a washing operation. In some washing machines, the electric motor may be connected to the drum via a transmission system including, for example, belts and pulleys or gears. The electric motor may also be connected to the drum via a drive shaft. Washing machines including the latter type of electric motor are often referred to as "direct drive" washing machines.

In horizontal washing machines, the washing cycle commonly includes several starting and stopping phases. More particularly, the drum starts to rotate in one direction in a starting phase. Once the drum has reached a desired tumbling speed, the drum enters a tumbling phase and rotates substantially at the desired tumbling speed. After the tumbling phase is completed, the washing cycle begins a stopping phase, and the speed of the drum decreases until the drum stops moving. The drum remains stationary for a preset period of time, until a new starting phase begins and the drum begins to rotate again, sometimes in the other rotational direction. Thus, in the entire washing cycle, the drum may be started from a stopped position many times.

Accordingly, starting the drum from a stopped position may require starting the electric motor from a stopped position. Additionally, the drum may be filled with laundry and water, meaning high motor torque may be required to start the rotation. For permanent magnet synchronous electric motors to deliver the required torque on start, the initial position of the rotor of the motor must be determined with reasonable accuracy. For motors with multiple electrical poles, the electrical position of the rotor may be determined rather than the physical rotor position.

SUMMARY

According to one aspect, a washing machine is disclosed. The washing machine includes an A.C.-D.C. converter including a positive output terminal and a negative output terminal, a permanent magnet synchronous motor including a rotor and three stator field coils, and a three-phase inverter electrically coupled to the output terminals of the A.C.-D.C. converter. The inverter includes three load terminals electrically coupled to the three stator field coils of the motor and a plurality of control switches operable to connect the three load terminals of the inverter to the output terminals of the A.C.-D.C. converter. The washing machine also includes an electronic motor controller, electrically coupled to the inverter. The motor controller includes a processor and a memory device. The memory device has stored therein a plurality of instructions which, when executed by the processor, cause the processor to determine a first set of three current polarities at the three load terminals, while the rotor is rotating and the three stator field coils are de-energized and connected together, the first set of three current polarities including a polarity for each of the three load terminals, detect a change in the current polarity at one of the three load terminals after determining the first set of three current polarities, determine a second set of three current polarities at the three load terminals after detecting the change in the current polarity, the second set of three current polarities including a polarity for each of the three load terminals of the inverter, and determine a rotor position based on the first set of current polarities and the second set of current polarities.

In some embodiments, the plurality of instructions, when executed by the processor, may cause the processor to send a control signal to the plurality of control switches of the inverter to de-energize the three stator field coils. In some embodiments, the plurality of instructions, when executed by the processor, may cause the processor to send the control signal when the rotor is rotating at a speed slower than ten revolutions per minute.

In some embodiments, the plurality of instructions, when executed by the processor, may cause the processor to send a control signal to the plurality of control switches of the inverter to electrically connect the three load terminals together. In some embodiments, the plurality of instructions, when executed by the processor, may cause the processor to send the control signal to the plurality of control switches to electrically connect the three load terminals by electrically connecting the three load terminals to a common output terminal of the A.C.-D.C. converter selected from the group consisting of the positive output terminal and the negative output terminal.

In some embodiments, the memory device may have stored therein a plurality of rotor positions as a look-up table associated with a plurality of current polarities at the three load terminals, and the plurality of instructions, when executed by the processor, may cause the processor to determine the rotor position by looking up the rotor position in the look-up table. In some embodiments, the look-up table may be associated with a plurality of rotational directions, and the plurality of instructions, when executed by the processor may cause the processor to look up the rotor position in the look-up table by determining a rotational direction of the rotor based on the first set of current polarities and the second set of current polarities and selecting the rotor position from the look-up table as a function of the second set of current polarities and the determined rotational direction.

According to another aspect, a method for determining a rotor position for a permanent magnet synchronous motor of a washing machine during a stopping phase of the washing machine is disclosed. The method includes determining a first set of three current polarities at three load terminals of an inverter of the washing machine, while the rotor is rotating and three stator field coils of the motor are de-energized and connected together, the first set of three current polarities including a polarity for each of the three load terminals, detecting a change in the current polarity at one of the three load terminals after determining the first set of current polarities, determining a second set of three current polarities at the three load terminals after detecting the change in current polarity, the second set of three current polarities including a polarity for each of the three load terminals, and determining the rotor position based on the first set of three current polarities and the second set of three current polarities.

In some embodiments, the method may include sending a control signal to the inverter to de-energize the three stator field coils. In some embodiments, sending the control signal may include sending the control signal when the rotor is rotating at a speed slower than ten revolutions per minute.

In some embodiments, the method may include sending a control signal to the inverter to electrically connect the three stator field coils to a common D.C. rail. In some embodiments, electrically connecting the three stator field coils to a common D.C. rail may include electrically connecting the three stator field coils to a D.C. rail selected from the group consisting of a positive D.C. rail and a negative D.C. rail.

In some embodiments, determining the rotor position may include selecting the rotor position from a look-up table, wherein the look-up table has stored therein a plurality of rotor positions as a function of a plurality of current polarities and the selected rotor position corresponds to the first set of three current polarities and the second set of three current polarities. In some embodiments, the look-up table may have further stored therein a plurality of rotational directions based on the plurality of current polarities, and selecting the rotor position from the look-up table may include determining a rotational direction of the rotor based on the first set of current polarities and the second set of current polarities, and selecting the rotor position from the look-up table as a function of the second set of current polarities and the determined rotational direction.

According to another aspect, the method includes determining three current values of three stator field coils of the motor, when the motor is de-energized, the three stator field coils are electrically connected to a common D.C. rail, and the rotor is rotating, transforming, using an alpha-beta transformation, the three current values into two current values $I_\alpha$ and $I_\beta$, determining, using a phase-locked loop circuit, a phase angle and an angular velocity based on the current values $I_\alpha$ and $I_\beta$, determining a phase offset based on the angular velocity, and determining the rotor position by summing the phase angle with the phase offset. In some embodiments, determining the phase offset may include determining a sign of the angular velocity and determining the phase offset by multiplying an angle equal to ninety degrees by the sign of the angular velocity.

In some embodiments, the method may include sending a control signal to an inverter of the washing machine to electrically connect the three stator field coils to the common D.C. rail, while the rotor rotates. In some embodiments, sending the control signal to the inverter may include sending the control signal after the rotor rotates slower than 10 revolutions per minute. In some embodiments, sending the control signal to the inverter may include sending the control signal to the inverter to electrically connect the three stator field coils to one of a positive D.C. rail and a negative D.C. rail.

BRIEF DESCRIPTION OF THE DRAWINGS

The detailed description particularly refers to the following figures, in which.

DETAILED DESCRIPTION OF THE DRAWINGS

Figure 1:
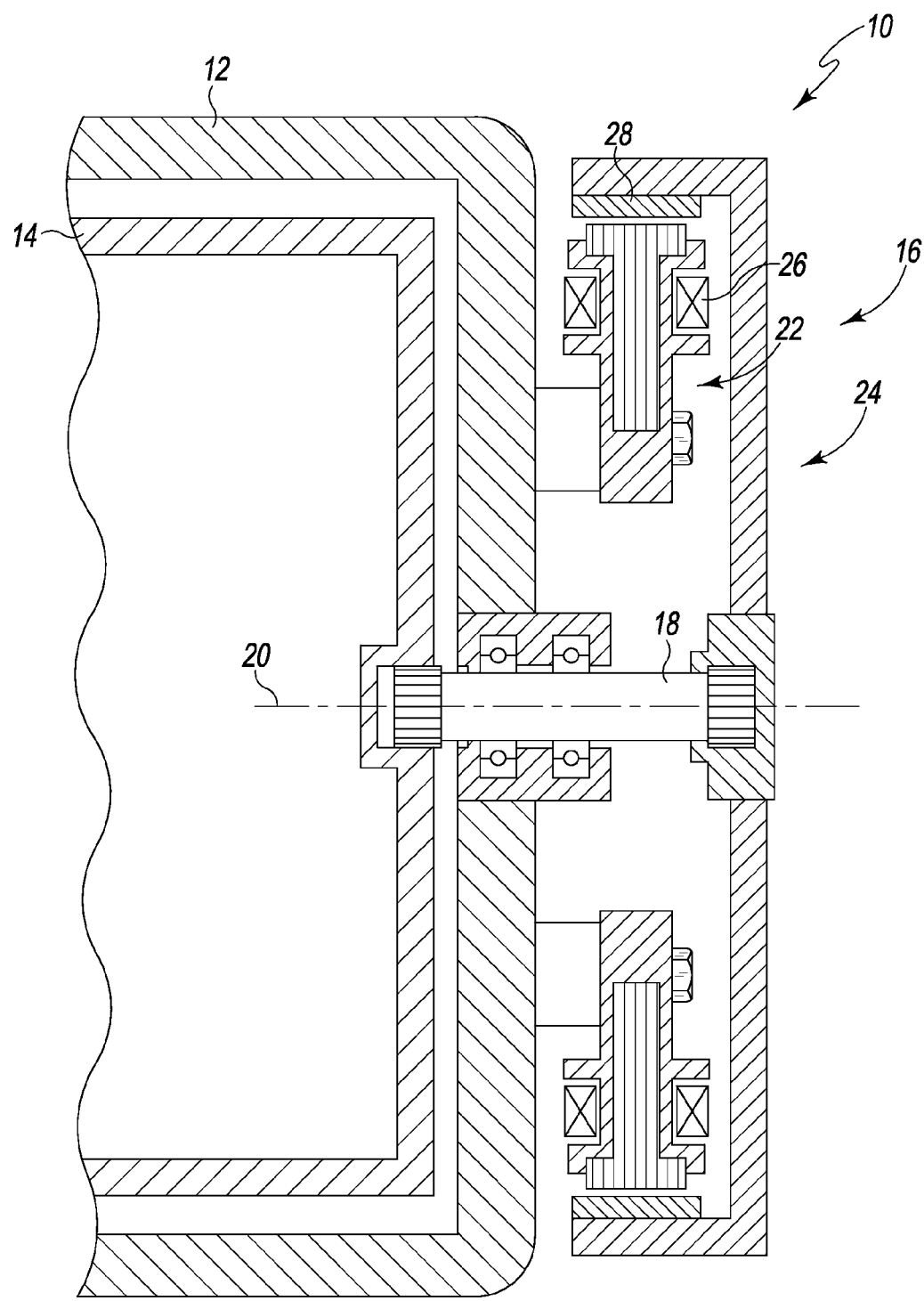
FIG. 1 is a cross-sectional side elevation view of a washing machine driven by a permanent magnet synchronous motor ("PMSM")

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Embodiments of the disclosed systems and methods may be implemented in hardware, firmware, software, or any combination thereof. Embodiments of the disclosed systems and methods implemented in a washing machine may include one or more point-to-point interconnects between components and/or one or more bus-based interconnects between components. Embodiments of the disclosed systems and methods may also be implemented as instructions stored on one or more non-transitory, machine-readable media, which may be read and executed by an electronic control unit. A non-transitory, machine-readable medium may include any mechanism for storing or transmitting information in a form readable by a machine (e.g., a processor). For example, non-transitory, machine-readable media may include read only memory (ROM), random access memory (RAM), magnetic disk storage, optical storage, flash memory, and/or other types of memory devices.

Referring now to FIG. 1, a washing machine 10 is shown. The washing machine 10 includes a tub 12, a drum 14 positioned in the tub 12, and an electric motor 16 operable to rotate the drum 14 via a drive shaft 18. The tub 12 includes a washing chamber defined by a number of side walls extending from a rear wall. The drum 14 of the washing machine 10 is positioned in the washing chamber of the tub 12. The drum 14 includes a cavity that is sized to receive clothes and other laundry to be washed in the washing machine 10. The tub 12 and the drum 14 may be formed from metallic materials, such as, for example, steel, or from polymeric materials, such as, for example, a rigid plastic resin.

The drum 14 is configured to rotate relative to the tub 12 about a rotational axis 20. As shown in FIG. 1, the drive shaft 18 is secured to the drum 14. During operation, the drum 14 is rotated about the axis 20 when the drive shaft 18 is driven by the motor 16. It should be appreciated that in other embodiments the drive shaft 18 may be connected indirectly to the drum 14 via a transmission system. In some embodiments, the transmission system may include a number of pulleys and belts or a gear assembly that is configured to translate the rotary motion of the drive shaft into rotational movement for the drum.

The motor 16 comprises a permanent magnet synchronous motor (also known as a brushless, alternating current (A.C.) motor). The motor 16 includes a stator 22 and a rotor 24 configured to rotate relative to the stator 22. The motor 16 includes a plurality of stator field coils 26 and one or more permanent magnets 28. The stator field coils 26 may be arranged into multiple electrical poles. During operation, the plurality of coils 26 may be sequentially supplied with current to generate magnetic fields that interact with the one or more permanent magnets 28 and, thus, cause the rotor 24 to rotate. Although illustrated in an outer rotor configuration in FIG. 1, it is contemplated that both inner and outer rotor configurations may be used with the present disclosure.

In the illustrative embodiment, the washing machine 10 is a front-loaded machine in which the drum 14 is accessed through an opening defined in the front (not shown) of the washing machine. It should be appreciated that in other embodiments the washing machine 10 may have other configurations. For example, the washing machine 10 may be a top-loaded machine in which the drum 14 is accessed through an opening defined in the top (not shown) of the washing machine 10. Further, in the illustrative embodiment the rotational axis 20 is horizontal. It should be appreciated that the rotational axis may have other configurations; for example, the rotational axis 20 may be vertical.

Figure 2:
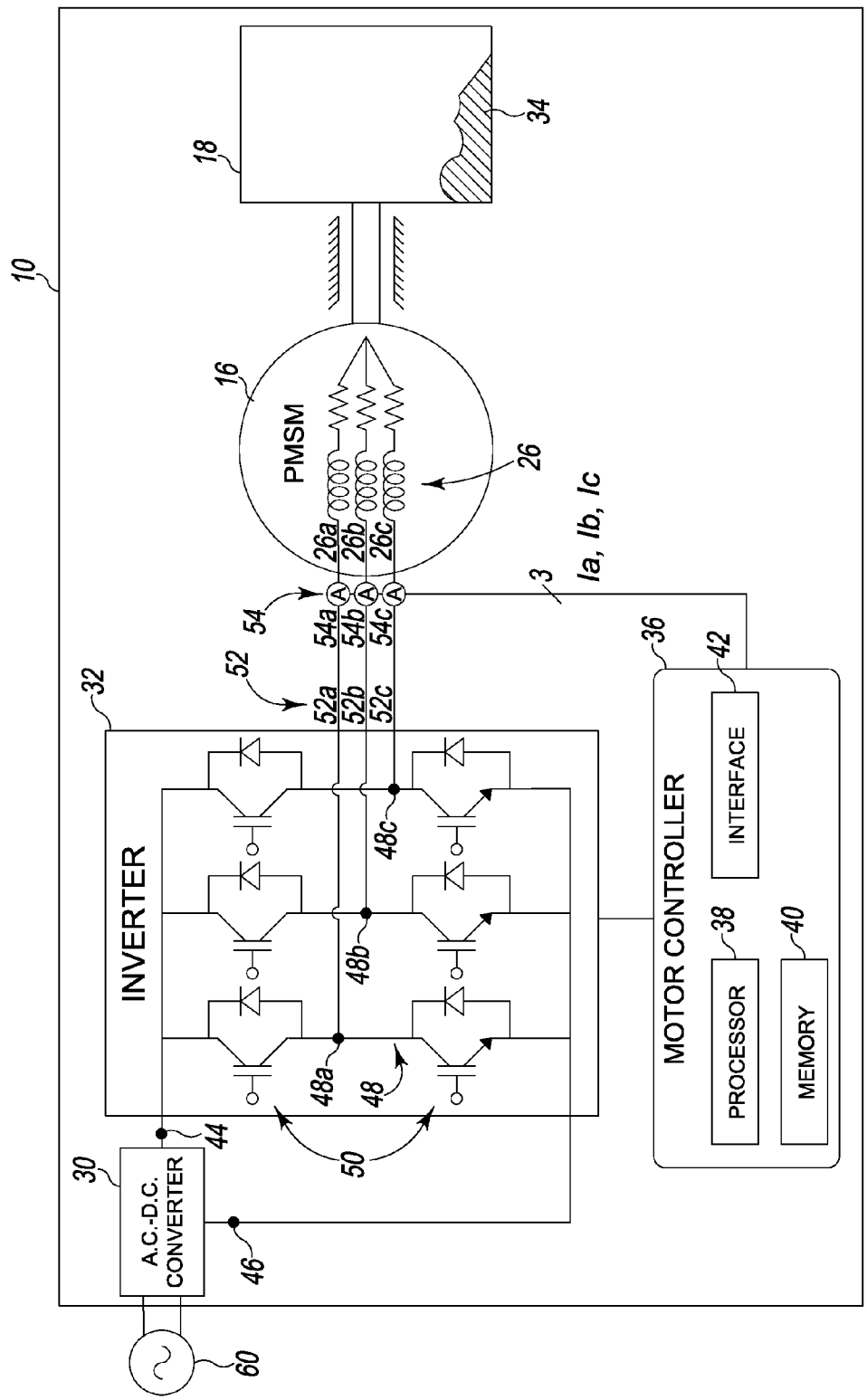
FIG. 2 is simplified block diagram of the washing machine of FIG. 1.

Referring now to FIG. 2, the washing machine 10 is shown in a simplified block diagram. The washing machine 10 illustratively includes an A.C.-D.C. converter 30, an inverter 32, the permanent magnet synchronous motor 16, the drum 14, and a motor controller 36. The drum 14 contains a load 34, which may include laundry and wash water. In some embodiments, the washing machine 10 may include additional and/or different components than those shown in FIG. 2 and described herein.

The A.C.-D.C. converter 30 of the washing machine 10 is electrically coupled to an external A.C. mains power supply 60. The A.C.-D.C. converter 30 is a power regulating circuit that transforms A.C. mains power (e.g., 240 V, 60 Hz) into direct current (D.C.) power and supplies this D.C. power via a positive terminal 44 and a negative terminal 46 to the other components of the washing machine 10. Such output terminals 44, 46 are often referred to as D.C. rails. In the illustrative washing machine 10, the A.C.-D.C. converter 30 is embodied as a rectifier.

As shown in FIG. 2, the inverter 32 of the washing machine 10 is electrically coupled to the positive terminal 44 and the negative terminal 46 of the A.C.-D.C. converter 30. The inverter 32 includes a plurality of load terminals 48 and a plurality of control switches 50. The control switches 50 are electrically operable to alternatively connect each load terminal 48 to one of the positive terminal 44 or negative terminal 46 of the A.C.-D.C. converter 30. The control switches 50 are illustrated as insulated-gate bipolar transistors (IGBTs), but may be metal-oxide-semiconductor field-effect transistors (MOSFETs) or other switching devices in other embodiments.

The inverter 32 is configured to sequentially supply current from the load terminals 48 to the plurality of stator field coils 26 of the motor 16 over the electrical connections 52. In the illustrative embodiment of FIG. 2, the motor 16 comprises three stator field coils 26a, 26b, and 26c. Each of the stator field coils 26a, 26b, 26c is connected by one of the electrical connections 52a, 52b, and 52c to a respective one of the load terminals 48a, 48b, and 48c of the inverter 32. It is contemplated that, in other embodiments, the motor 16 may comprise additional or fewer field coils and may have additional or fewer electrical connections to the inverter 32.

The electrical connections 52a, 52b, 52c between the inverter 32 and the motor 16 are commonly called phases; thus, the inverter 32 may also be referred to as a three-phase inverter. Electrical current flowing through a stator field coil is thus commonly referred to as a phase current.

The washing machine 10 includes a plurality of current sensors 54 to generate signals representative of the electrical current in the electrical connections 52. In the illustrative embodiment of FIG. 2, current sensors 54a, 54b, 54c are operatively coupled to the electrical connections 52a, 52b, 52c. The current sensors 54a, 54b, 54c generate signals $I_a$, $I_b$, $I_c$ representative of the phase current in each respective electrical connection 52a, 52b, 52c. The current sensors 54a, 54b, 54c may be embodied as shunt resistors, Hall effect sensors, or other current-measuring component. Although illustrated as separate components, in some embodiments the current sensors 54a, 54b, 54c may be incorporated in another component, such as the inverter 32.

The washing machine 10 also includes a motor controller 36. The motor controller 36 is a dedicated controller for the inverter 32 and the motor 16. In other embodiments, the motor controller 36 may also control additional functions of the washing machine 10. The motor controller 36 is, in essence, the master computer responsible for interpreting electrical signals sent by controls and sensors associated with the inverter 32, the current sensors 54, and the motor 16 (and other components of the washing machine 10, in some embodiments) and for activating or energizing electronically-controlled components associated with the inverter 32 and the motor 16 (and other components of the washing machine 10, in some embodiments). For example, the motor controller 36 is configured to control the inverter 32 to supply current to the plurality of coils of the motor 16, to receive various signals from the inverter 32 (e.g., the phase currents $I_a$, $I_b$, $I_c$, or information related thereto), and to determine when various operations of the washing machine 10 should be performed, amongst many other things. In particular, as will be described in more detail below with reference to FIGS. 3 and 4, the motor controller 36 is operable to determine a stopping position of the rotor 24 of the motor 16.

To do so, the motor controller 36 may include a number of electronic components commonly associated with electronic units utilized in the control of electromechanical systems. For example, the motor controller 36 may include, amongst other components customarily included in such devices, a processor such as a microprocessor 38 and a memory device 40. The microprocessor 38 may be any type of device capable of executing software or firmware, such as a microcontroller, microprocessor, digital signal processor, or the like. The memory device 40 may be embodied as one or more non-transitory, machine-readable media. The memory device 40 is provided to store, amongst other things, instructions in the form of, for example, a software routine (or routines) which, when executed by the microprocessor 38, allows the motor controller 36 to control operation of the washing machine 10.

The motor controller 36 also includes an analog interface circuit 42. The analog interface circuit 42 converts output signals (e.g., from the inverter 32) into signals which are suitable for presentation to an input of the microprocessor 38. In particular, the analog interface circuit 42, by use of an analog-to-digital (A/D) converter (not shown) or the like, converts analog signals into digital signals for use by the microprocessor 38. It should be appreciated that the A/D converter may be embodied as a discrete device or number of devices, or may be integrated into the microprocessor 38. It should be appreciated that if the inverter 32 (or any other sensor associated with the washing machine 10) generates a digital output signal, the analog interface circuit 42 may be bypassed.

Similarly, the analog interface circuit 42 converts signals from the microprocessor 38 into output signals which are suitable for presentation to the electrically-controlled components associated with the washing machine 10 (e.g., the inverter 32). In particular, the analog interface circuit 42, by use of a digital-to-analog (D/A) converter (not shown) or the like, converts the digital signals generated by the microprocessor 38 into analog signals for use by the electronically-controlled components associated with the washing machine 10. It should be appreciated that, similar to the A/D converter described above, the D/A converter may be embodied as a discrete device or number of devices, or may be integrated into the microprocessor 38. It should also be appreciated that if the inverter 32 (or any other electronically-controlled component associated with the washing machine 10) operates on a digital input signal, the analog interface circuit 42 may be bypassed.

Thus, the motor controller 36 may control and/or monitor operation of the motor 16 via the inverter 32. In particular, the motor controller 36 executes a routine including, amongst other things, a control scheme in which the motor controller 36 monitors one or more signals from the inverter 32 (e.g., phase current signals) to determine the stopping position of the rotor 24 of the motor 16. As part of this control scheme, the motor controller 36 may perform numerous calculations, either continuously or intermittently, including looking up values in preprogrammed tables, in order to execute algorithms to perform such functions as determining current values of the electrical phases of the inverter 32, transforming current signals into a stationary reference frame, determining angular frequency and phase offset of the current signals, etcetera.

Figure 3:
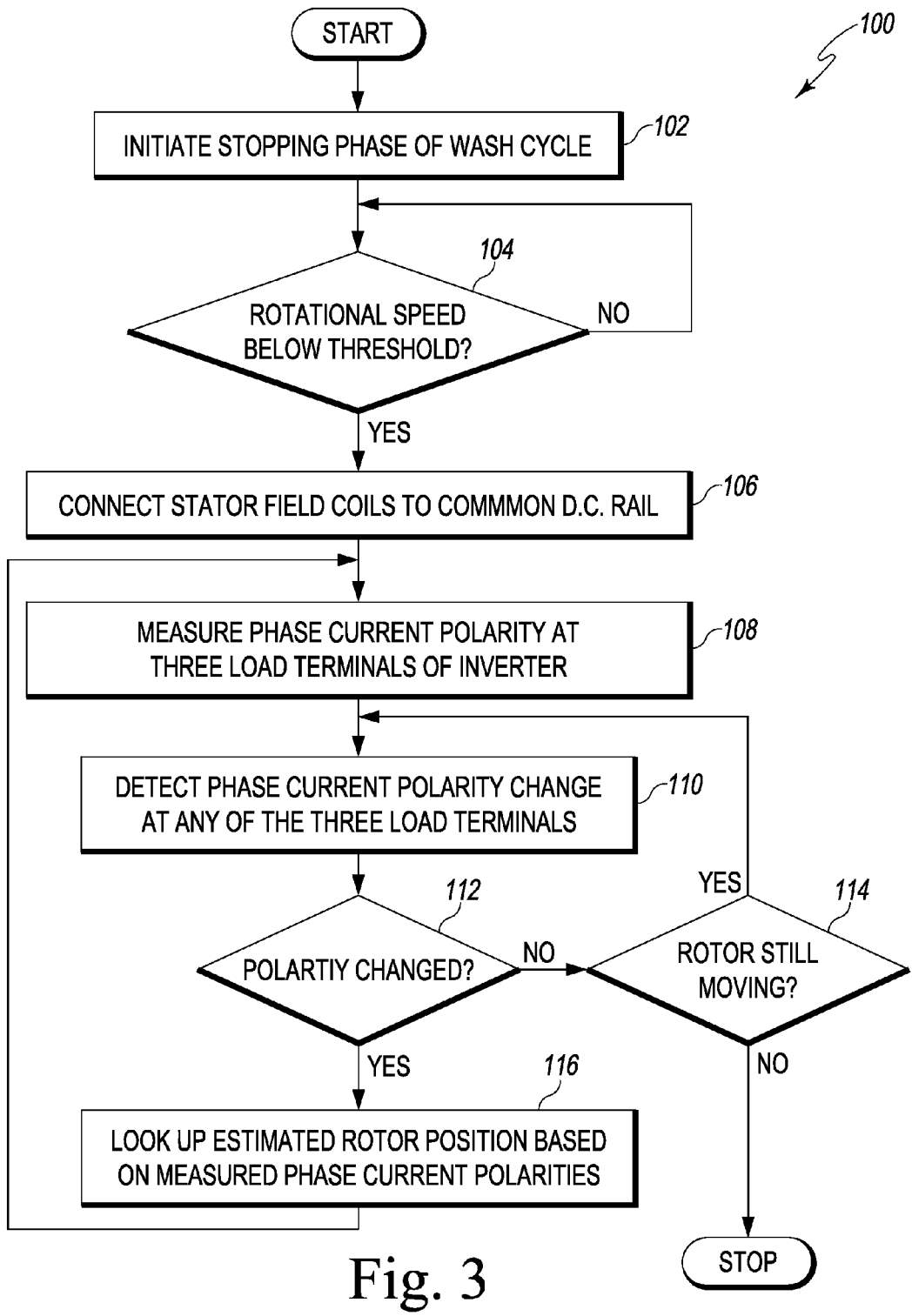
FIG. 3 is a simplified flow diagram of one embodiment of a subroutine for determining rotor position of the PMSM of the washing machine of FIGS. 1 and 2.

Referring now to FIG. 3, an illustrative embodiment of a control subroutine 100 for determining a rotor stopping position of the motor 16 of FIG. 2 is illustrated as a simplified flow diagram. The subroutine 100 may be executed by the motor controller 36 (in conjunction with the inverter 32). The subroutine 100 commences with step 102, in which the washing machine 10 initiates a stopping phase of the wash cycle. As discussed above, each washing cycle consists of a series of starting phases, tumbling phases, and stopping phases. The washing machine 10 may initiate a stopping phase based on elapsed time, sensor data, or other criteria. To initiate the stopping phase, the motor controller 36 de-energizes the stator field coils 26 of the motor 16. To do so, the motor controller 36 stops sending control signals to the switches 50 of the inverter 32 to sequentially energize the stator field coils. After the stator field coils are de-energized, the rotor 24 continues to rotate due to inertia.

After the stopping phase has been initiated, the subroutine 100 advances to step 104. In step 104, the motor controller 36 determines whether the rotational speed of the rotor 24 has dropped below a threshold rotational speed, for example, ten revolutions per minute. A conventional motor control scheme of the motor controller 36 is used to determine the rotor speed until the speed drops below the threshold. If the rotational speed is not below the threshold, the subroutine loops back and repeats step 104. If the rotational speed is below the threshold, the subroutine advances to step 106.

In step 106, the motor controller 36 sends control signals to the switches 50 of the inverter 32 to connect all of its load terminals 48 to a common output terminal of the A.C.-D.C. converter 30, either the positive terminal 44 or the negative terminal 46. By connecting the inverter load terminals to a common D.C. rail, the stator field coils 26 of the motor 16 are also connected together. Because the motor 16 continues to rotate, the permanent magnets 28 of the motor 16 induce electrical currents in the stator field coils 26 of the motor 16 and at the corresponding load terminals 48 of the inverter 32.

In step 108, the motor controller 36 determines the current polarity at each load terminal 48 of the inverter 32. The motor controller 36 determines whether electrical current is flowing into or out of the inverter 32 at each load terminal 48. More specifically, using signals from the current sensors 54a, 54b, 54c, the motor controller 36 determines whether the electrical current of each of the three load terminals 48a, 48b, 48c of the inverter 32 is positive, negative, or zero.

In step 110, the motor controller 36 again determines the current polarities at the load terminals 48 of the inverter 32 to detect a change in polarity of any one of the phases. As the rotor 24 rotates in the motor 16, the induced current also progresses sequentially through the stator field coils 26 of the motor 16. Therefore, the current at only one of the load terminals 48 changes polarity at a time. For example, if the current polarity at load terminal 48a changes from negative to zero, the current polarities at the other two load terminals 48b, 48c do not change. In step 112, the motor controller 36 determines whether a change in current polarity has been detected. If a change in current polarity has been detected, the subroutine 100 advances to step 116. If no change has been detected, the subroutine advances to step 114.

In step 116, the motor controller 36 looks up a rotor position in a table of rotor positions, based on the two sets of phase polarities measured in steps 108 and 110. An illustrative rotor position table is included below as Table 1. Because the motor 16 may rotate in either direction, a single set of current polarities does not unambiguously identify the rotor position. By using two sequential sets of current polarities, the rotor position may be determined. First, the rotational direction of the rotor is determined. Table 1 lists phase polarities in the order produced by positive rotation of the rotor 24. Thus, rotational direction may be determined by locating the first set of polarities in the table and then determining whether the second set of polarities appears before or after the first set. For example, given first polarities $(I_a, I_b, I_c)=(<0, <0, >0)$ and second polarities $(I_a, I_b, I_c)=(<0, 0, >0)$, the second polarities appear before the first polarities in Table 1 and therefore represent a negative rotational direction. Second, after determining rotational direction, the rotor position is determined by looking up the entry for the second set of polarities associated with the determined rotational direction. Returning to the above example, given second polarities $(I_a, I_b, I_c)=(<0, 0, >0)$ and negative rotational direction, the current rotor position is $$-\frac{\pi}{3},$$

expressed in radians. Following step 116, the subroutine 100 loops back to step 108 to continue determining the rotor position.

TABLE 1

Rotor Position Based on Current Polarities

| Current Polarities | | | Rotor Position (radians) | |
|---|---|---|---|---|
| $I_a$ | $I_b$ | $I_c$ | Positive Rotation | Negative Rotation |
| 0 | >0 | <0 | 0 | $\pi$ |
| <0 | >0 | <0 | $\frac{\pi}{6}$ | $-\frac{5\pi}{6}$ |
| <0 | >0 | 0 | $\frac{\pi}{3}$ | $-\frac{2\pi}{3}$ |
| <0 | >0 | >0 | $\frac{\pi}{2}$ | $-\frac{\pi}{2}$ |
| <0 | 0 | >0 | $\frac{2\pi}{3}$ | $-\frac{\pi}{3}$ |

TABLE 1-continued

Rotor Position Based on Current Polarities

| Current Polarities | | | Rotor Position (radians) | |
|---|---|---|---|---|
| $I_a$ | $I_b$ | $I_c$ | Positive Rotation | Negative Rotation |
| <0 | <0 | >0 | $\frac{5\pi}{6}$ | $-\frac{\pi}{6}$ |
| 0 | <0 | >0 | $\pi$ | 0 |
| >0 | <0 | >0 | $-\frac{5\pi}{6}$ | $\frac{\pi}{6}$ |
| >0 | <0 | 0 | $-\frac{2\pi}{3}$ | $\frac{\pi}{3}$ |
| >0 | <0 | <0 | $-\frac{\pi}{2}$ | $\frac{\pi}{2}$ |
| >0 | 0 | <0 | $-\frac{\pi}{3}$ | $\frac{2\pi}{3}$ |
| >0 | >0 | <0 | $-\frac{\pi}{6}$ | $\frac{5\pi}{6}$ |

Referring back to step 112, if no change in current polarity has been detected, the subroutine advances to step 114. In step 114, the motor controller 36 determines whether the rotor 24 has continued to rotate. The motor controller 36 may determine whether the rotor continues to rotate by, for example, determining the amount of time elapsed since the last current polarity change was detected. In such example, if a reference time has been exceeded, the motor controller 36 may determine the rotor is no longer rotating. If the motor controller 36 determines the rotor is still rotating, then the subroutine 100 loops back to step 110 to continue detecting current polarities. If the motor controller 36 determines the rotor is not rotating, then the subroutine 100 is completed.

Figure 4A:
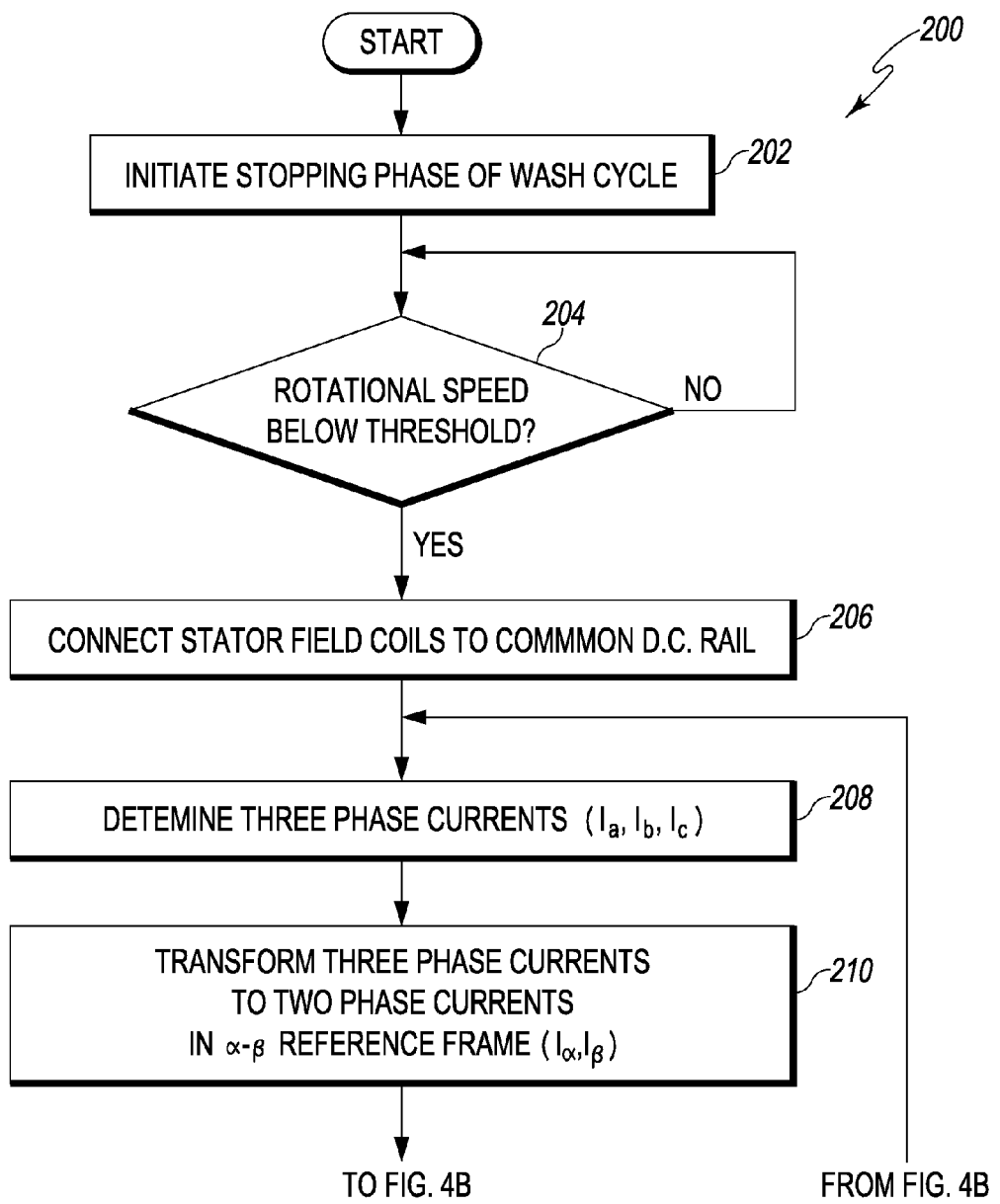
FIGS. 4A and 4B are a simplified flow diagram of another embodiment of a subroutine for determining rotor position of the PMSM of the washing machine of FIGS. 1 and 2.

Referring now to FIG. 4A, another illustrative embodiment of a control subroutine (i.e., subroutine 200) of determining the rotor stopping position of the motor 16 of FIG. 2 is illustrated as a simplified flow diagram. Subroutine 200 commences with step 202, in which the washing machine 10 initiates a stopping phase of the wash cycle. As discussed above, each washing cycle consists of a series of starting phases, tumbling phases, and stopping phases. The washing machine 10 may initiate a stopping phase based on elapsed time, sensor data, or other criteria. To initiate the stopping phase, the motor controller 36 de-energizes the stator field coils 26 of the motor 16. To do so, the motor controller 36 stops sending control signals to the control switches 50 of the inverter 32 to sequentially energize the stator field coils. After the stator field coils are de-energized, the rotor 24 continues to rotate due to inertia.

After the stopping phase has been initiated, the subroutine 200 advances to step 204. In step 204, the motor controller 36 determines whether the rotational speed of the rotor 24 has dropped below a threshold rotational speed, for example, ten revolutions per minute. A conventional motor control scheme of the motor controller 36 is used to determine the rotor speed until the speed drops below the threshold. If the rotational speed is not below the threshold, the subroutine loops back and repeats step 204. If the rotational speed is below the threshold, the subroutine advances to step 206.

In step 206, the motor controller 36 sends control signals to the switches 50 of the inverter 32 to connect all of its load terminals 48 to a common output terminal of the A.C.-D.C. converter 30, either the positive terminal 44 or the negative terminal 46. By connecting the inverter load terminals to a common D.C. rail, the stator field coils 26 of the motor 16 are also connected together. Because the motor 16 continues to rotate, the permanent magnets 28 of the motor 16 induce electrical currents in the stator field coils 26 of the motor 16 and at the corresponding load terminals 48 of the inverter 32.

The induced currents at the load terminals of the inverter 32 may be used to determine the rotational position of the rotor. The induced stator current may be described by the following mathematical relationship:

$$\vec{i}_s = \frac{j\omega\vec{\lambda}}{R_s + j\omega L_d}. \tag{1}$$

In Equation 1, $\vec{i}_s$ is the induced stator current in vector form, $\omega$ is the angular velocity of the rotor, $\vec{\lambda}$ is the flux vector of the rotor, $R_s$ is the stator resistance, and $L_d$ is the inductance of the stator. Because the motor 16 is synchronous, the angle of the flux vector $\vec{\lambda}$ is equivalent to the angular position of the rotor. For low angular velocity $\omega$, the induced stator current may be approximated as:

$$\vec{i}_s \approx \frac{j\omega\vec{\lambda}}{R_s}. \tag{2}$$

Thus, the angle of the flux vector $\vec{\lambda}$ (and the rotor 24 of the motor 16) is roughly ninety degrees out of phase with the angle of the induced stator current $\vec{i}_s$.

In step 208, the motor controller 36 determines three phase currents $I_a$, $I_b$, and $I_c$ corresponding to the currents at each of the load terminals 48 of the inverter 32 (and, therefore, also the currents of the stator field coils 26 of the motor 16). More specifically, using signals from the current sensors 54a, 54b, 54c, the motor controller 36 determines the values of phase currents $I_a$, $I_b$, and $I_c$.

In step 210, the motor controller 36 transforms the three phase currents $I_a$, $I_b$, and $I_c$ into a stationary frame of reference. Such stationary frame is sometimes called an alpha-beta reference frame. Thus, the transformed phase signals are labeled $I_\alpha$ and $I_\beta$. The motor controller 36 may perform such transform using a Clarke transformation. The Clarke transformation may be described by the mathematical relationship:

$$\begin{bmatrix} I_\alpha \\ I_\beta \end{bmatrix} = \begin{bmatrix} 1 & 0 \\ \frac{1}{\sqrt{3}} & \frac{2}{\sqrt{3}} \end{bmatrix} \begin{bmatrix} I_a \\ I_b \end{bmatrix}. \tag{3}$$

Figure 4B:
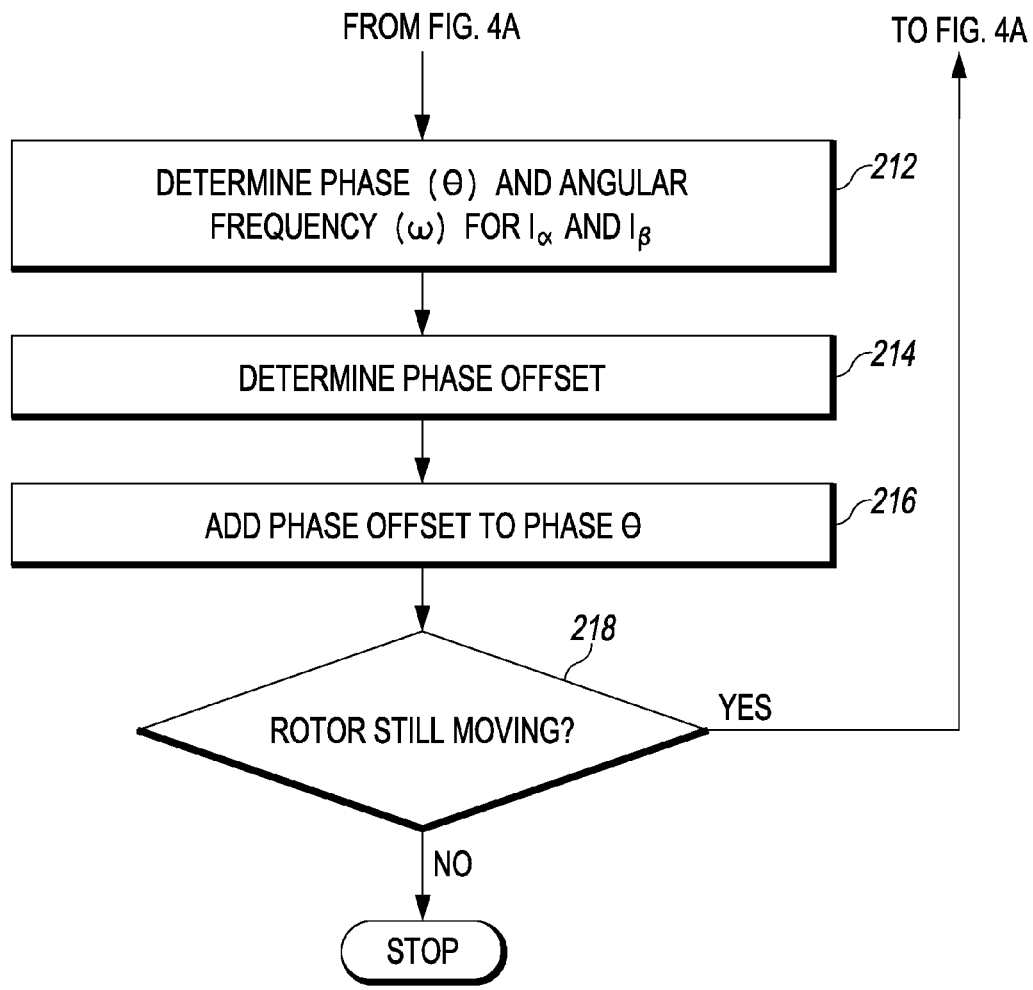

Referring now to FIG. 4B, in step 212, the motor controller 36 determines a phase angle θ and angular velocity ω based on the transformed currents $I_\alpha$ and $I_\beta$. The motor controller 36 may perform such determination using a phase-locked loop (PLL), which may include, for example, a phase frequency detector. To perform that determination, the transformed phase signals $I_\alpha$ and $I_\beta$ are input into the PLL, the PLL compares the two input signals and produces a phase angle θ and an angular velocity ω. The angular velocity ω represents the speed of rotation of the rotor 24 of the motor 16, and may be positive or negative, depending on the direction of rotation.

In step 214, the motor controller 36 determines the phase offset. As discussed above, the phase offset is a function of the direction of rotation, i.e., the sign of the angular velocity ω. Accordingly, the motor controller 36 determines whether the angular velocity ω is greater then zero. If greater than zero, the phase offset is a positive number, for example $$\frac{\pi}{2}$$

(or ninety degrees). If the angular velocity ω is not greater than zero, then the phase offset is a negative number, for example $$-\frac{\pi}{2}$$

(or negative ninety degrees).

In step 216, the motor controller 36 adds the phase offset determined in step 214 to the phase angle θ determined in step 212 to determine the rotor position. Thus, in steps 214 and 216, the motor controller 36 determines the rotor position by adjusting the phase angle θ by an appropriate phase offset, based on the sign of the angular velocity ω.

In step 218, the motor controller 36 determines whether the rotor 24 is still moving. The motor controller 36 may make such determination by, for example, determining whether the angular velocity ω is equal to zero. If the rotor 24 is still moving, the subroutine 200 loops back to step 208 to continue determining rotor position. If the rotor 24 is not still moving, the subroutine 200 is completed.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A washing machine comprising:
an A.C.-D.C. converter, comprising a positive output terminal and a negative output terminal,
a permanent magnet synchronous motor comprising a rotor and three stator field coils,
a three-phase inverter, electrically coupled to the output terminals of the A.C.-D.C. converter, the inverter comprising (i) three load terminals electrically coupled to the three stator field coils of the motor, and (ii) a plurality of control switches operable to connect the three load terminals of the inverter to the output terminals of the A.C.-D.C. converter, and
an electronic motor controller, electrically coupled to the inverter, the motor controller comprising (i) a processor and (ii) a memory device, the memory device having stored therein a plurality of instructions which, when executed by the processor, cause the processor to:
determine a first set of three current polarities at the three load terminals, while the rotor is rotating and the three stator field coils are de-energized and connected together, the first set of three current polarities including a polarity for each of the three load terminals,
detect a change in the current polarity at one of the three load terminals after determining the first set of three current polarities,
determine a second set of three current polarities at the three load terminals after detecting the change in the current polarity, the second set of three current polarities including a polarity for each of the three load terminals of the inverter, and
determine a rotor position based on the first set of current polarities and the second set of current polarities.

2. The washing machine of claim 1, wherein the plurality of instructions, when executed by the processor, further cause the processor to send a control signal to the plurality of control switches of the inverter to de-energize the three stator field coils.

3. The washing machine of claim 2, wherein the plurality of instructions, when executed by the processor, further cause the processor to send the control signal when the rotor is rotating at a speed slower than ten revolutions per minute.

4. The washing machine of claim 1, wherein the plurality of instructions, when executed by the processor, further cause the processor to send a control signal to the plurality of control switches of the inverter to electrically connect the three load terminals together.

5. The washing machine of claim 4, wherein the plurality of instructions, when executed by the processor, further cause the processor to send the control signal to the plurality of control switches to electrically connect the three load terminals by electrically connecting the three load terminals to a common output terminal of the A.C.-D.C. converter selected from the group consisting of the positive output terminal and the negative output terminal.

6. The washing machine of claim 1, wherein:
the memory device has stored therein a plurality of rotor positions as a look-up table associated with a plurality of current polarities at the three load terminals, and
the plurality of instructions, when executed by the processor, further cause the processor to determine the rotor position by looking up the rotor position in the look-up table.

7. The washing machine of claim 6, wherein:
the look-up table is further associated with a plurality of rotational directions, and
the plurality of instructions, when executed by the processor cause the processor to look up the rotor position in the look-up table by:
determining a rotational direction of the rotor based on the first set of current polarities and the second set of current polarities, and
selecting the rotor position from the look-up table as a function of the second set of current polarities and the determined rotational direction.

8. A method for determining a rotor position for a permanent magnet synchronous motor of a washing machine during a stopping phase of the washing machine, the method comprising:
determining a first set of three current polarities at three load terminals of an inverter of the washing machine, while the rotor is rotating and three stator field coils of the motor are de-energized and connected together, the first set of three current polarities including a polarity for each of the three load terminals, detecting a change in the current polarity at one of the three load terminals after determining the first set of current polarities, determining a second set of three current polarities at the three load terminals after detecting the change in current polarity, the second set of three current polarities including a polarity for each of the three load terminals, and determining the rotor position based on the first set of three current polarities and the second set of three current polarities.

9. The method of claim 8, further comprising sending a control signal to the inverter to de-energize the three stator field coils.

10. The method of claim 9 wherein sending the control signal comprises sending the control signal when the rotor is rotating at a speed slower than ten revolutions per minute.

11. The method of claim 8, further comprising sending a control signal to the inverter to electrically connect the three stator field coils to a common D.C. rail.

12. The method of claim 11, wherein electrically connecting the three stator field coils to a common D.C. rail comprises electrically connecting the three stator field coils to a D.C. rail selected from the group consisting of a positive D.C. rail and a negative D.C. rail.

13. The method of claim 8, wherein determining the rotor position comprises selecting the rotor position from a look-up table, wherein the look-up table has stored therein a plurality of rotor positions as a function of a plurality of current polarities and the selected rotor position corresponds to the first set of three current polarities and the second set of three current polarities.

14. The method of claim 13, wherein the look-up table has further stored therein a plurality of rotational directions based on the plurality of current polarities, and selecting the rotor position from the look-up table comprises:

determining a rotational direction of the rotor based on the first set of current polarities and the second set of current polarities, and selecting the rotor position from the look-up table as a function of the second set of current polarities and the determined rotational direction.

15. A method for determining a rotor position for a permanent magnet synchronous motor of a washing machine during a stopping phase of the washing machine, the method comprising:

determining three current values of three stator field coils of the motor, when the motor is de-energized, the three stator field coils are electrically connected to a common D.C. rail, and the rotor is rotating, transforming, using an alpha-beta transformation, the three current values into two current values $I_\alpha$ and $I_\beta$, determining, using a phase-locked loop circuit, a phase angle and an angular velocity based on the current values $I_\alpha$ and $I_\beta$, determining a phase offset based on the angular velocity, and determining the rotor position by summing the phase angle with the phase offset.

16. The method of claim 15, wherein determining the phase offset comprises:

determining a sign of the angular velocity, and determining the phase offset by multiplying an angle equal to ninety degrees by the sign of the angular velocity.

17. The method of claim 15, further comprising sending a control signal to an inverter of the washing machine to electrically connect the three stator field coils to the common D.C. rail, while the rotor rotates.

18. The method of claim 17, wherein sending the control signal to the inverter comprises sending the control signal after the rotor rotates slower than 10 revolutions per minute.

19. The method of claim 17, wherein sending the control signal to the inverter comprises sending the control signal to the inverter to electrically connect the three stator field coils to one of a positive D.C. rail and a negative D.C. rail.

* * * * *